United States Patent
Collier et al.

(10) Patent No.: US 10,355,858 B2
(45) Date of Patent: Jul. 16, 2019

(54) AUTHENTICATING A SYSTEM TO ENABLE ACCESS TO A DIAGNOSTIC INTERFACE IN A STORAGE DEVICE

(71) Applicant: INTEL CORPORATION, Santa Clara, CA (US)

(72) Inventors: Brandon Collier, Beaverton, OR (US); Thomas R. Bowen, Albuquerque, NM (US); Adrian R. Pearson, Hillsboro, OR (US); Jason R. Cox, Longmont, CO (US)

(73) Assignee: INTEL CORPORATION, Santa Clara, CA (US)

(*) Notice: Subject to any disclaimer, the term of this patent is extended or adjusted under 35 U.S.C. 154(b) by 301 days.

(21) Appl. No.: 15/086,040

(22) Filed: Mar. 30, 2016

(65) Prior Publication Data
US 2017/0288867 A1 Oct. 5, 2017

(51) Int. Cl.
H04L 9/08 (2006.01)
G06F 21/60 (2013.01)
H04L 9/30 (2006.01)

(52) U.S. Cl.
CPC .......... *H04L 9/0861* (2013.01); *G06F 21/602* (2013.01); *H04L 9/30* (2013.01)

(58) Field of Classification Search
USPC ........ 713/193, 150, 163, 181; 726/2, 21, 36; 380/255, 264, 276
See application file for complete search history.

(56) References Cited

U.S. PATENT DOCUMENTS

2004/0153642 A1* 8/2004 Plotkin .................. G06F 21/85
713/150
2009/0083372 A1* 3/2009 Teppler ................. H04L 9/3226
709/203

(Continued)

OTHER PUBLICATIONS

Wikipedia, "Challenge-Response Authentication", [online], Last modified Jan. 3, 2016, [Retrieved on Feb. 5, 2016], Retrieved from the Internet at <URL: https://en.wikipedia.org/w/index.php?title=Challenge-response_authentication&oldid=698063434>, 4 pp.

(Continued)

*Primary Examiner* — Sharif E Ullah
(74) *Attorney, Agent, or Firm* — Konrad Raynes Davda & Victor LLP; David W. Victor

(57) ABSTRACT

Provided are an apparatus, system, and method authenticating a system to access diagnostic interface in a storage device. The storage device includes a computer readable storage medium implemented to store data and a controller. The controller receives a request from the computer system to initiate a cryptographic nonce to access diagnostic interface in the storage device. The controller generates a nonce and returns to the computer system. Upon receiving an unlock request from the computer system to access the diagnostic interface including a signed nonce comprising at least the nonce encrypted with a private key by the authorized unlock system, the controller uses a public key that is a cryptographic pair with the private key to decrypt the signed nonce to determine whether to grant the computer system access to the diagnostic interface in the storage device.

14 Claims, 8 Drawing Sheets

(56) References Cited

U.S. PATENT DOCUMENTS

2013/0275656 A1* 10/2013 Talagala .............. G06F 12/0246
711/103
2015/0312233 A1* 10/2015 Graham, III ............ H04L 9/006
713/171

OTHER PUBLICATIONS

Wikipedia, "Public Key Certificate", [online], Last modified Jan. 31, 2016, [Retrieved on Feb. 7, 2016], Retrieved from the Internet at <URL: https://en.wikipedia.org/w/index.php?title=Public_key_certificate&oldid=702606327>, 7 pp.

Wikipedia, "Public Key Infrastructure", [online], Last modified Jan. 26, 2016, [Retrieved on Feb. 5, 2016], Retrieved from the Internet at <URL: https://en.wikipedia.org/w/index.php?title=Public_key_infrastructure&oldid=701835486>, 6 pp.

Wikipedia, "Public-Key Cryptography", [online], Last modified Feb. 3, 2016, [Retrieved on Feb. 5, 2016], Retrieved from the Internet at <URL: https://en.wikipedia.org/w/index.php?title=Public-key_cryptography&oldid=703042387>, 14 pp.

Wikipedia, "Symmetric-Key Algorithm", [online], Last modified Dec. 12, 2015, [Retrieved on Feb. 5, 2016], Retrieved from the Internet at <URL: https://en.wikipedia.org/w/index.php?title=Symmetric-key_algorithm&oldid=694944589>, 3 pp.

Wikipedia, "Trusted Platform Module", [online], Last modified Feb. 3, 2016, [Retrieved on Feb. 7, 2016], Retrieved from the Internet at <URL: https://en.wikipedia.org/w/index.php?title=Trusted_Plafform_Module&oldid=703058477>, 7 pp.

* cited by examiner

AUTHENTICATING A SYSTEM TO ENABLE ACCESS TO A DIAGNOSTIC INTERFACE IN A STORAGE DEVICE

TECHNICAL FIELD

Embodiments described herein generally relate to authenticate a system to allow access to a diagnostic interface in a storage device.

BACKGROUND

Storage device manufacturers, such as makers of Solid State Drives (SSDs), include diagnostic programs and a diagnostic interface in the storage device to allow testing and diagnostics to be performed during production and after the device has shipped into the field. These diagnostic tests and commands provide the ability to modify various physical device characteristics and/or access sensitive data in a fashion not available during normal drive use and operations. Manufacturers need to limit access to this diagnostic interface to prevent malicious software from exploiting diagnostic commands to launch a broad based permanent denial of service attack on the storage devices and/or divulge confidential user information.

One prior art technique for restricting access to the diagnostic interface is to provide additional diagnostic access pins on the storage drive pin interface that are not mapped on a normal computer drive interface. A special purpose electronic circuit board must be provided that has extra pins to interface with the special diagnostic pins on the storage device. An unlock sequence may be issued on these additional pins to enter a mode where a user can issue diagnostic commands to the storage device. In this way, prior art techniques are dependent on the physical presence of the storage drive to access and a special purpose electronic circuit board.

There is a need in the art for improved solutions to provide a secure access to the diagnostic interface of a storage device.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
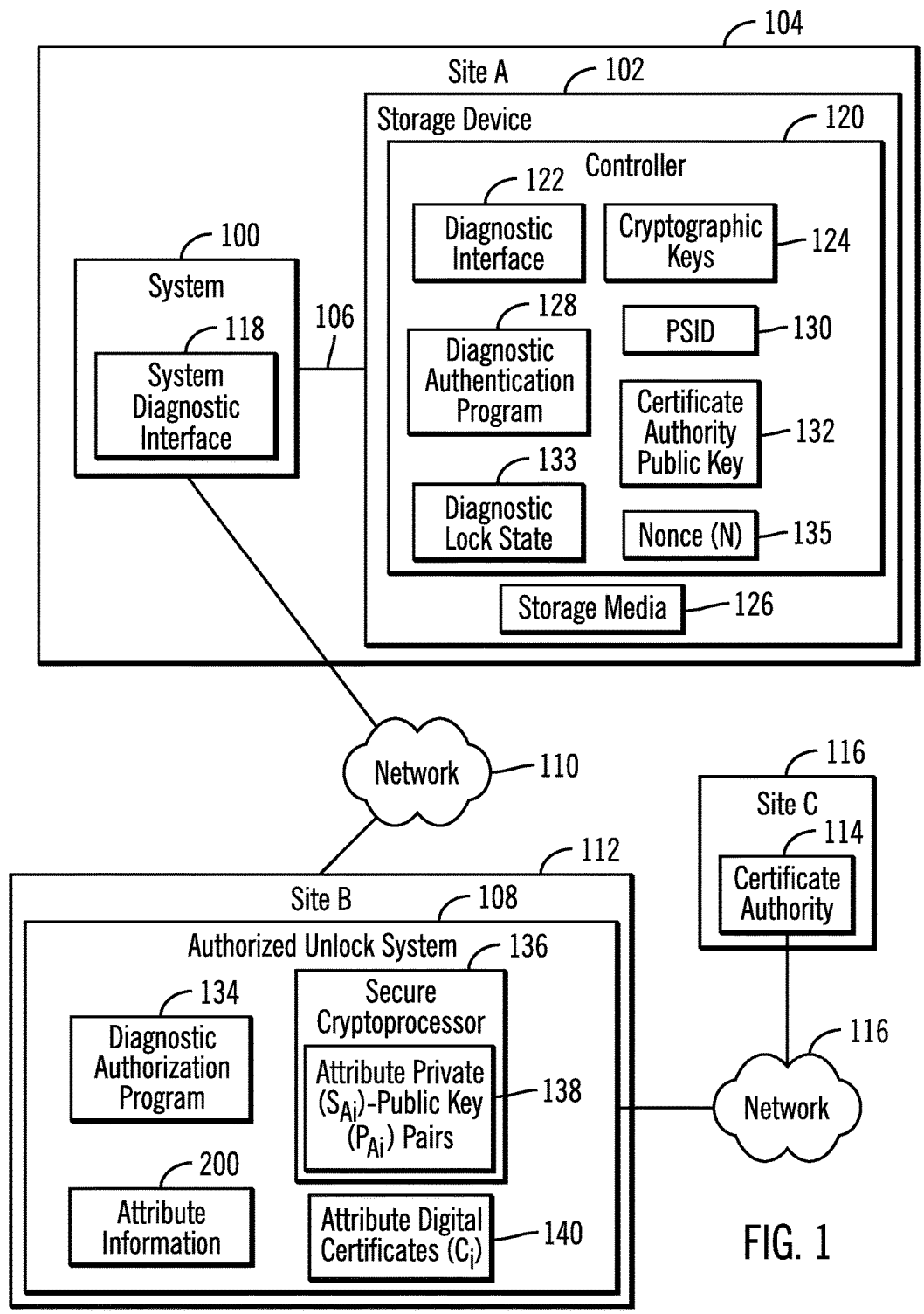
FIG. 1 illustrates an embodiment of an authentication environment to access diagnostic interface in a storage device.

Described embodiments provide techniques for secure access to the diagnostic interface of a storage drive by having a system (for example, a computer system) seeking to access the diagnostic interface obtain a cryptographic challenge from the storage drive to present to an authorized unlock system. The authorized unlock system may then sign the challenge to produce a signed challenge that the system may then present to the storage drive to authenticate access to the diagnostic interface. The authorized unlock system may be verified by using a public-private key pair whose public key is verified by a trusted certificate authority, which may be operated by the manufacturer or vendor of the storage device.

In described embodiments, a system seeking to access the diagnostic interface in the storage device sends a request to the storage device to initiate authentication to access the diagnostic interface. The storage device generates a nonce to return to the system in response to the request. The system transmits the nonce and the attribute to an authorized unlock system which maintains a plurality of attribute private keys, wherein for each of the private keys there is a public key of a cryptographic public-private key pair, and wherein there is one attribute private key for a different of a plurality of attributes of a storage device. The authorized unlock system determines an attribute private key comprising the attribute private key associated with the attribute received with the nonce. The nonce is encrypted with the determined attribute private key to produce a signed nonce, which is returned to the system. The system sends the signed nonce to the storage device with an unlock request for authentication to access diagnostic interface in the storage device.

Upon receiving the unlock request, the storage device uses a public key that is a cryptographic pair with the private key to decrypt the signed nonce and verify that the nonce in the signed nonce matches the nonce that was generated. The storage device grants the computer system access to the diagnostic interface in the storage device in response to verifying that the nonce in the signed nonce matches the nonce that was generated.

In further embodiments, the system sends the unlock request with a physical presence security identifier (PSID) indicated on the storage device. The storage device determines whether the PSID included with the unlock request matches a local PSID stored in the storage device, wherein the computer system is granted access to the diagnostic interface in response to determine that the PSID included with the unlock request matches the local PSID.

The described embodiments provide an asymmetric diagnostic unlock mechanism based on public-private key infrastructure. The storage device maintains a public key counterpart from a certificate authority, such as the manufacturer or vendor of the storage device, where the certificate authority holds the private key. The storage device uses the public key to decrypt and authenticate the certificate of the authorized unlock system, followed by using the public key from the certificate of the authorized unlock system to decrypt the signed nonce, which results in authenticating the unlock request from the system. After authenticating the signed nonce for the diagnostic interface, the storage drive will then enable the diagnostic interface, for example, test and debug interfaces as necessary. Further, the storage drive may require the system requesting access provide a PSID to ensure that a user of the system seeking to access the diagnostic interface is able to read/scan the label of the drive which contains a unique identifier only accessible by reading a label on the storage device. The label can be affixed on the disk drive casing and read and entered by the user of the system, or be scanned by a bar code or other device.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

FIG. 1 illustrates an embodiment of a computing environment having a system 100 coupled to a storage device 102 at a site A 104 or location, such as a manufacturing, production or repair facility for the storage device 102. The system 100 may be coupled to the storage device 102 over a connection 106, such as a storage drive interface, such as a Peripheral Component Interconnect (PCI) bus, AT Attachment (ATA) interface, Small Computer System Interface (SCSI), Serial Attached SCSI (SAS), Universal Serial Bus (USB), a wireless connection, etc. The system 100 may access the diagnostic interface in the storage device 102. When requesting access to the diagnostic interface in the storage device 102, the system 100 may request a signed nonce from an authorized unlock system 108 over a network 110, where the authorization unlock system 108 may be at a different site B 110 than the system 100 at site A 104. In one embodiment, the network 110 connecting the system 100 and authorized unlock system 108 may comprise a virtual private network (VPN), where the system 100 is authorized to communicate with the authorized unlock system 108, such as in a same security zone in the network 110 or has login credentials maintained at the authorized unlock system 108.

The authorized unlock system 108 communicates with a certificate authority 114 over a network 116, which may comprise a different or same network than the network 110, to obtain certification of its public and private keys it generates for types of storage devices 102. The certificate authority 114 may comprise a computer server operated by the vendor or manufacturer of the storage device 102 that certifies the ownership of keys maintained by the authorized unlock system 108 to verify that the authorized unlock system is in a relationship of trust with the manufacturer or vendor of the storage device 102, i.e., an entity that the owner of the storage device 102 can trust. In this way, the storage drive manufacturer or vendor can distribute authorized unlock systems 108 in multiple different locations to provide signed nonces to diagnostic computer systems 100 to use to authenticate access to diagnostic interface within the storage devices 102 at different locations. The authorized unlock systems 108 can demonstrate their trust and authorization from a trusted third party, such as the vendor or manufacturer of the storage device 102, by receiving a digital certificate of their public keys from the certificate authority 114, which is maintained by the storage device 102 vendor or manufacturer. The certificate authority 114 may be at yet a separate site C 116 location.

The system 100 may include a system diagnostic interface 118 program that interacts with the storage device 102 and authorized unlock system 108 to authenticate and verify its access to the storage device 102 to obtain permission by the storage device 102 to access diagnostic interface 122 in the storage device.

The storage device 102 includes a controller 120 that controls access to a storage media 126 on which data is stored. The controller 120 includes diagnostic interface 122 comprising programs and routines to perform diagnostic operations when invoked by the system diagnostic interface 118; cryptographic keys 124 the controller 120 uses to encrypt and decrypt data stored in the storage media 126; a diagnostic authentication program 128 used to authenticate the system 100 seeking to access the diagnostic interface 122; a physical presence secure identifier (PSID) 130 used to verify that the storage device 102 is in a same location as the system 100 seeking access, where an instance of the PSID 130 code may be included on a label of the storage device 102 visible to users, such as text affixed to an encasing of the storage device 102 (e.g., directly printed on the encasing or printed on a label attached to the encasing of the storage device 102); a certificate authority public key 132 that may be used to decrypt encrypted messages and digital signatures from the trusted certificate authority 114; and a diagnostic lock state 133 indicating whether access to the diagnostic interface 122 is permitted (unlocked) or not permitted (locked). If the diagnostic lock state 133 is unlocked, it may further indicate whether the unlock state is persistent, remains in effect even after a power cycle event, or transient, returns to the locked state after a power cycle event. A power cycle event comprises any event where power is interrupted to the storage device 102, including a cold or warm restart, power-on-reset, shutdown, reboot, etc.

The diagnostic interface 122 may comprise programs that are invoked to perform diagnostic related operations within the storage device 102, such as uploading a new version of firmware; providing debugging capabilities; directly reading/writing, in a raw fashion, media blocks internal to the device; erasing all of the media blocks internal to the device; downloading firmware for execution from internal Dynamic Random Access Memory (DRAM)/Static Random Access Memory (SRAM); updating a map of bad blocks on the device; resetting the controller 120; updating a fuse configuration; etc.

The storage device 102 may generate a new nonce 135 in response to a request from the system 100 for a nonce to initiate an authentication process with the system 100. The nonce 135 may comprise a cryptographic nonce to ensure that every nonce is unique for each request to access the diagnostic interface. The nonce may further comprise an arbitrary number, comprising a random or pseudo random number, or other text or code that may only be used for one request from a system to ensure that the nonce cannot be reused in replay attacks. In certain embodiments, the nonce may be stored in volatile memory in the storage device 102 (such as a buffer in the controller 120), such that it is lost in the event of power disruption or power cycle event.

In one embodiment, the PSID is only accessible by reading or scanning the physical label on the storage device 102. The PSID 130 information in the storage device 102 may be cryptographically protected in the storage device 102 firmware/metadata such that it cannot be read directly an external system in any fashion.

The storage device 102 may comprise a solid state drive (SSD), flash drive, etc. For SSD implementations, the data storage media 126 may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage device 102 may also comprise, but not limited to, MLC NAND flash memory, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory, energy source backed (battery/super-capacitor) DRAM, and other electrically erasable programmable read only memory (EEPROM) type devices. In an alternative embodiment, the storage device 102 may comprise another type of storage device, such as a hard disk drive, etc. In embodiments, where the storage device 102 comprises a hard disk drive, the data storage media 126 may comprise a magnetic disk.

The authorized unlock system 108 may include a diagnostic authorization program 134 to process requests from the system diagnostic interface 118 and interact with the certificate authority 114; a secure cryptoprocessor 136, such as a Trusted Platform Module (TPM), which is capable of generating attribute private ($S_{Ai}$)-public ($P_{Ai}$) key pairs 138 for different attribute values of storage devices 102, such as a model number, manufacturer, serial number, etc.; attribute key information 200 having information on the attribute private keys for different storage device attributes; and attribute digital certificates 140 ($C_i$) obtained from the certificate authority 114 to certify the ownership and trust of the keys 138 generated by the authorized unlock system 108. For $S_{Ai}$, "S" represents a private key and "Ai" indicates storage device attribute i, generated by the secure cryptoprocessor 136, which may be stored in the secure cryptoprocessor 136. For "$C_i$", i indicates an attribute digital certificate "C" for an attribute i. For ($P_{Ai}$), "P" indicates a public key for storage device attribute "Ai".

The system diagnostic interface 118, diagnostic authentication program 128, and diagnostic authorization program 134 may comprise computer program instructions stored in a computer readable storage medium that are executed by a processor to perform the described operations. In alternative embodiments, the operations of the system diagnostic interface 118, diagnostic authentication program 128, and diagnostic authorization program 134 may be in whole or in part implemented in hardware logic, such as an application specific integrated circuit (ASIC).

Figure 2:
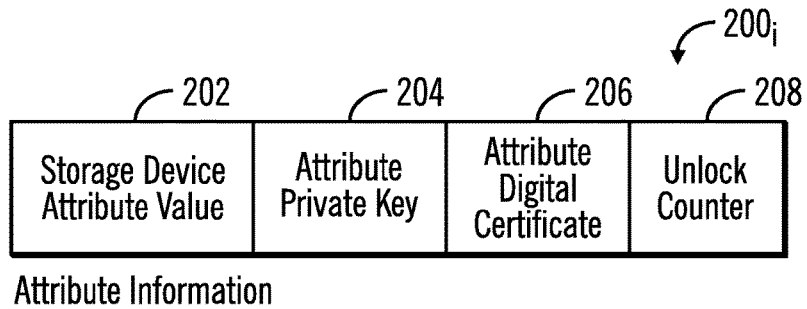
FIG. 2 illustrates an embodiment of attribute information maintained by an authorized unlock system.

FIG. 2 illustrates an embodiments of an instance of attribute information $200_i$ maintained for one of the storage device attribute values, such as storage device model number or name, including: a storage device attribute value 202 of an attribute for which the information $200_i$ is provided; an identification of an attribute private key ($S_{Ai}$) 204, generated by the secure cryptoprocessor 136, which may be stored in the secure cryptoprocessor 136; an identification of an attribute digital certificate 206 ($C_i$) providing a certification of the attribute public key ($P_{Ai}$) from the trusted certificate authority 114; and an unlock counter 208 indicating a number of times systems 100 have requested to unlock the diagnostic interface 112 for a storage device 102 having the attribute 202.

Figure 3:
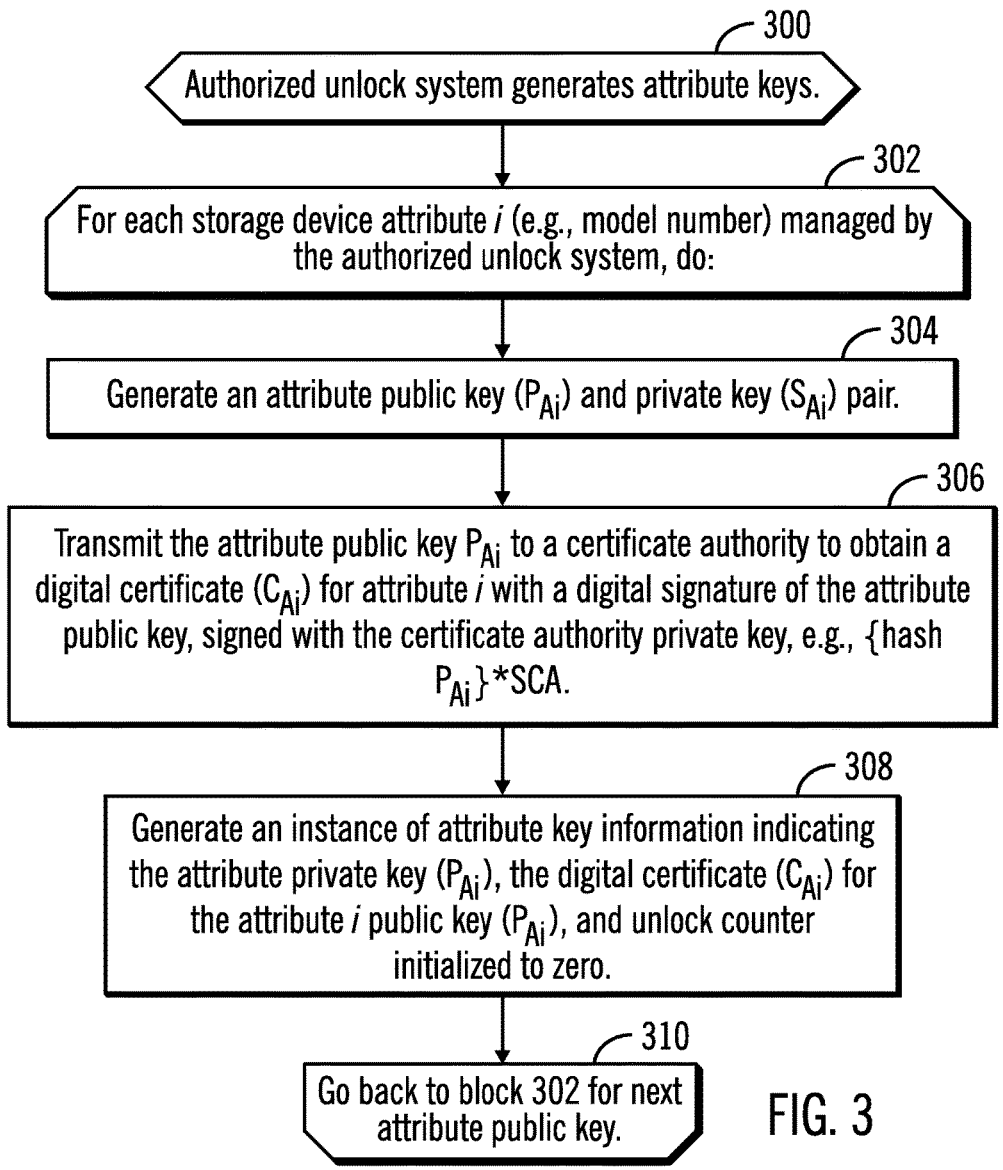
FIG. 3 illustrates an embodiment of operations performed by the authorized unlock system to generate attribute keys for attributes of storage devices.

FIG. 3 illustrates an embodiment of operations performed by the diagnostic authorization program 134 and other programs in the authorized unlock system 108 to generate an attribute private ($S_{Ai}$) and public ($P_{Ai}$) key pair for each attribute i of the storage devices 102 assigned to the authorized unlock system 108 to handle. Upon initiating operations to generate the attribute public-private key pairs 138, the diagnostic authorization program 134 performs the operations at blocks 302-310 for each storage device attribute i of storage device attributes managed by the authorized unlock system 108, such as a model number. The diagnostic authorization program 134 interacts with the secure cryptoprocessor 136 to generate (at block 304) an attribute private-public key pair 138 for attribute i.

The diagnostic authorization program 134 transmits (at block 306) the generated attribute public key ($P_{Ai}$) of the pair 138 to the certificate authority 114 to obtain a digital certificate ($C_{Ai}$) 140 for storage device attribute i having a digital signature of the attribute public key ($P_{Ai}$), signed with the certificate authority private key, e.g., {hash $P_{Ai}$}$S_{CA}$. The private key $S_{CA}$ comprises the certificate authority 114 private key which is used to encrypt a cryptograph hash of the attribute public key $P_{Ai}$. In this way, the certificate $C_{Ai}$ verifies that the attribute public key ($P_{Ai}$) has been authorized by a trusted authority, which certifies that the public key ($P_{Ai}$) as from a trusted authorized unlock system 108. The digital certificate 140 may include, among other elements, a signature algorithm used to create the digital signature of the attribute public key, {hash $P_{Ai}$}$S_{CA}$, an issuer or the certificate authority 114, the attribute public key ($P_{Ai}$).

The diagnostic authorization program 134 generates (at block 308) an instance of attribute information $200_i$ indicating the attribute private key ($P_{Ai}$) 204, identification of the digital certificate ($C_{Ai}$) 206 for the attribute i public key ($P_{Ai}$), and an unlock counter 208, also referred to as an expiration counter, initialized to zero. With the operations of FIG. 3, the diagnostic authorization program 134 will use the public/private key pairs 138, attribute digital certificates 140, and attributes (Ai) that correspond to the storage devices 102 needing to be unlocked to sign nonces of these storage devices in an authorized fashion.

Figure 4:
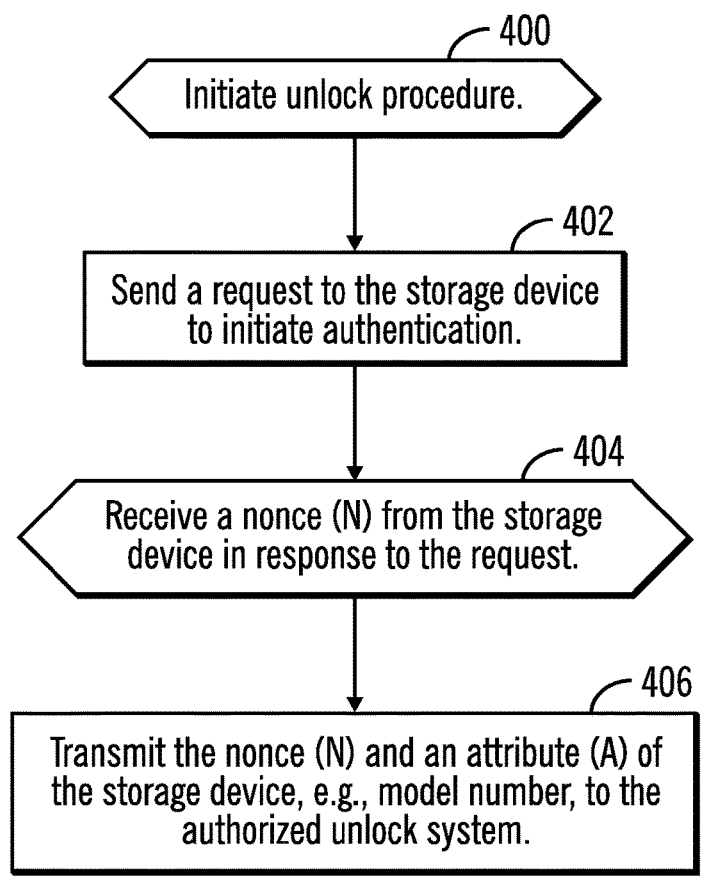
FIG. 4 illustrates an embodiment of operations performed by a system to initiate an unlock procedure to access diagnostic interface in the storage device.

FIG. 4 illustrates an embodiment of operations performed by the system diagnostic interface 118 in the system 100 to unlock the storage device 102 diagnostic tool 122 for use to perform diagnostic operations in the storage device 102. The system diagnostic interface 118 may provide a user interface to a user to initiate the operations to unlock the diagnostic interface 122 in the storage device 102 and to receive input used for the authentication operations and to invoke specific diagnostic interface 112. Upon initiating (at block 400) the unlock procedure, the system 100 sends a request, such as a get diagnostic unlock information command, to initiate authentication with the storage device 102 to access the diagnostic interface 122. In response to this request, the storage device 102 diagnostic authentication program 128 may generate a nonce 135 for use for only one request to access diagnostic interface to authenticate the system 100.

Upon the system diagnostic interface 118 receiving (at block 404) the nonce (N) from the storage device 102, the diagnostic interface 118 transmits (at block 406) the nonce (N) and an attribute (A) of the storage device 102, such as the model number, to the authorized unlock system 108 to sign the nonce (N) to produce a signed nonce which is used to authenticate to the storage device 102 that the system 100 is a trusted device by receiving a digital signature from the authorized unlock system 108, which is verified as a trusted device by the certificate authority 114.

Figure 5:
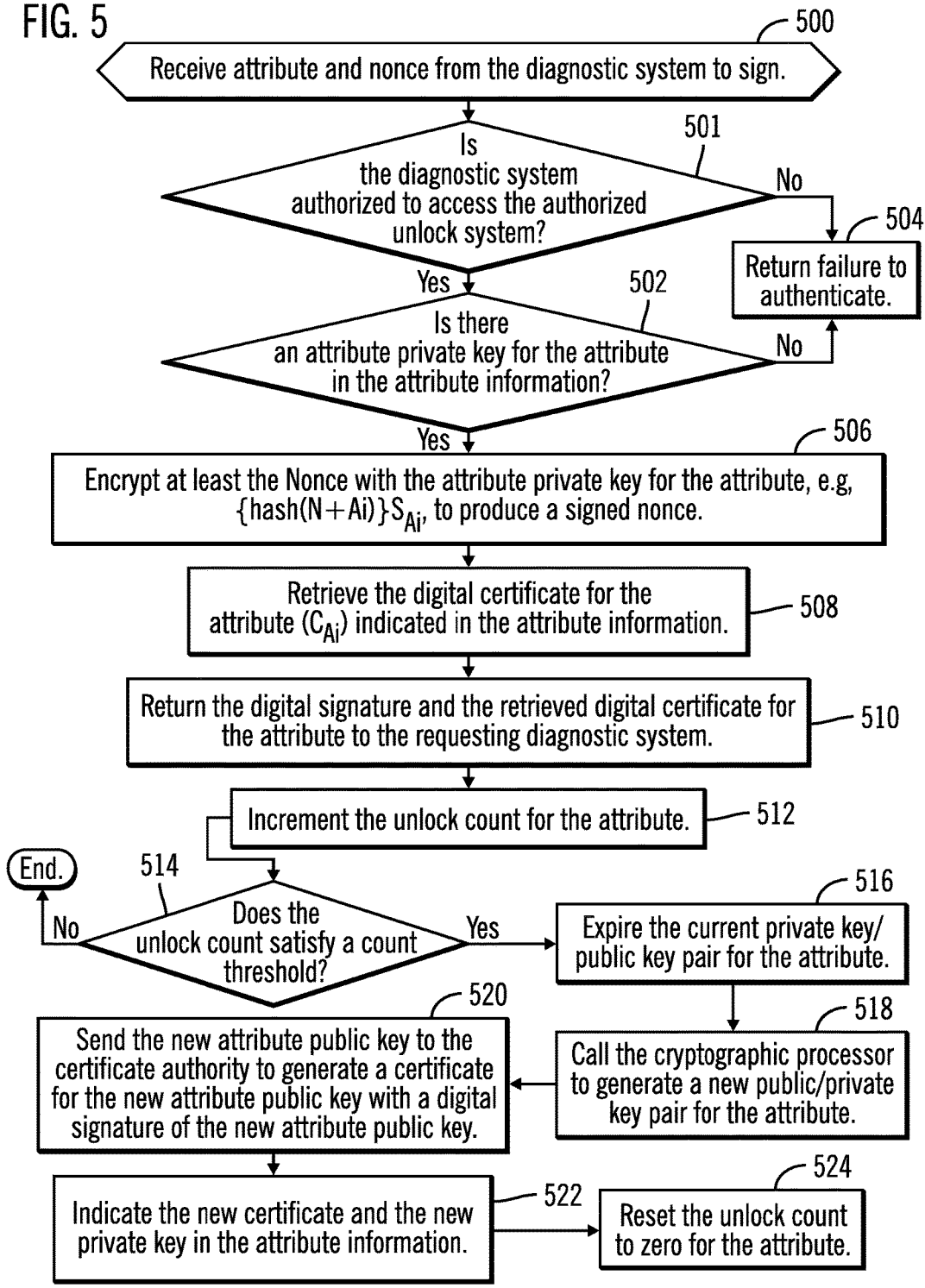
FIG. 5 illustrates an embodiment of operations performed by the authorized unlock system to sign a challenge from the storage device to provide a signed challenge that may be used to authenticate the system.

FIG. 5 illustrates an embodiment of operations performed by the diagnostic authorization program 134 of the authorized unlock system 108 to cryptographically sign the nonce (N) to verify to the storage device 102 that the system 100 asserting the request to access the diagnostic interface 122 is to be trusted. Upon receiving the storage device attribute (A) and nonce (N) from the system 100, the diagnostic authorization program 134 determines (at block 501) whether the system 100 is authorized to access the authorized unlock system 108, so that only authorized systems can communicate a nonce to the authorized unlock system 108. If (at block 501) the system 100 is not authorized, then failure to authenticate is returned (at block 506) to the system 100. If (at block 501) the system 100 is authorized to communicate a nonce to sign, then the diagnostic authorization program 134 determines (at block 502) whether there is an attribute private key ($S_{Ai}$) for the received attribute in the attribute information 200, i.e., an instance $200_i$ having the attribute value 202 of the received attribute. If not, then failure to authenticate is returned (at block 504) to the system 100 initiating the request because the authorized unlock system 108 is not authorized to authorize requests for storage devices having the requested attribute.

If (at block 502) the attribute information 200 has an instance $200_i$ for the received attribute i of the storage device, then the diagnostic authorization program 134 encrypts (at block 506) at least the nonce (N) with the attribute private key ($S_{Ai}$) 204. In one embodiment, the diagnostic authorization program 134 may digitally sign by first taking a cryptographic hash of the nonce (N) and the attribute ($A_i$) and then encrypting with the attribute private key ($S_{Ai}$) 204, e.g., {hash(N+Ai)}$S_{Ai}$, to produce the signed nonce. The digital certificate for the attribute ($C_{Ai}$) 206 indicated in the attribute information $200_i$ is retrieved (at block 508). The diagnostic authorization program 134 returns (at block 510) the signed nonce (e.g., {hash(N+Ai)}$S_{Ai}$) and the retrieved digital certificate ($C_{Ai}$) 206 for the attribute i to the requesting system 100.

The diagnostic authorization program 134 may then increment (at block 512) the unlock counter 208 for the requested storage device attribute. If (at block 514) the incremented unlock counter 208 does not satisfy a count threshold, e.g., is not equal to or not greater than the count threshold, then control ends. However, if (at block 514) the unlock counter 208 satisfies the threshold, then the attribute private key $S_{Ai}$ has been used a maximum number of times. In such case, the current attribute private key ($S_{Ai}$) and public key ($P_{Ai}$) pair 138 for attribute i are expired (at block 516) and the cryptographic secure processor 136 is called (at block 518) to generate a new public/private key pair 138 for the storage device attribute i. The diagnostic authorization program 134 sends (at block 520) the new attribute public key ($P_{Ai}'$) to the certificate authority 114 to generate a new certificate ($C_{Ai}'$) for the new attribute public key ($P_{Ai}'$) with a digital signature of the new public key ($P_{Ai}'$) for the attribute i, which may comprise a cryptographic hash of the new public key ($P_{Ai}'$) encrypted with the certificate authority private key ($S_{CA}$).

Upon receiving the new certificate from the certificate authority, the diagnostic authorization program 134 indicates (at block 522) the new certificate ($C_{Ai}'$) and the new public key ($P_{Ai}'$) in the attribute information $200_i$ for the attribute i. The unlock counter 208 is reset (at block 524) to zero. With these operations, the private and public key pair 138 are occasionally regenerated and certified. Other events may result in the expiration of a private-public key pair 138, such as a duration, etc.

In an alternative implementation, the unlock counter check at blocks 514 through 524 may be performed before block 506, so that the nonce is not encrypted and returned if the unlock counter 208 is exceeded, which at such point an new attribute private key/public key pair 138 is obtained for the storage device to unlock.

In the described embodiment, the expiration counter comprised an unlock counter 208 incremented each time access is provided to the diagnostic interface. In an alternative embodiment, the expiration counter may comprise a timer, such that the expiration counter expires indicating that a new attribute private/public key pair 138 needs to be obtained when the timer reaches a threshold time to expire the attribute private/public key pair 138 after a time period. In a still further embodiment, both an unlock counter and timer may be used to determine to expire the attribute private/public key pair 138 upon expiration of the first expiration counter, e.g., unlock counter reaching maximum count or timer reaching threshold elapsed time.

With the operations of FIG. 5, the authorized unlock system 108 will encrypt the nonce (N) with an attribute private key $S_{Ai}$ that can be verified as authorized using the attribute public key $P_{Ai}$ certified and verified in the digital certificate ($C_{Ai}$) from the trusted certificate authority 114. This information is then used to authenticate to the storage device 102 that the signed nonce is from a system 100 that can be trusted.

Figure 6:
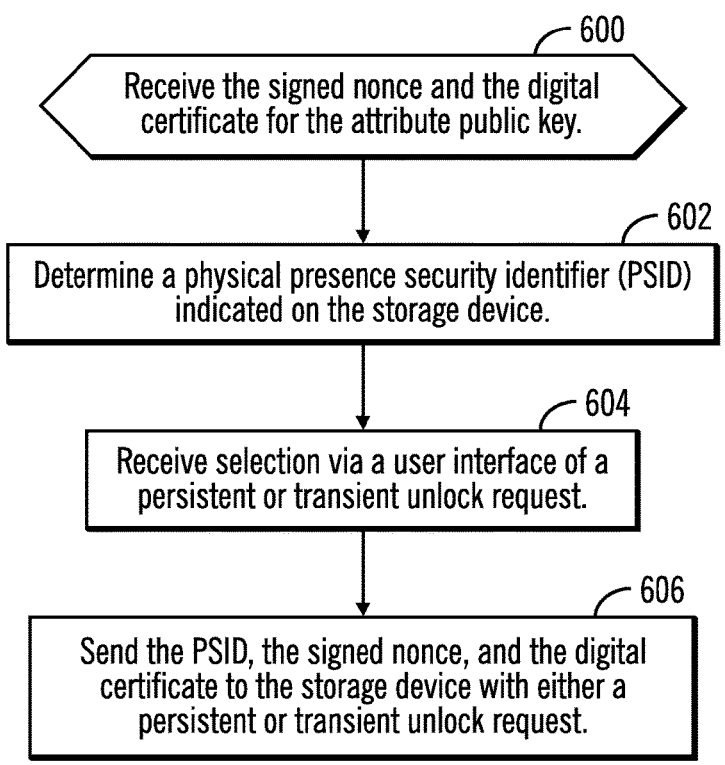
FIG. 6 illustrates an embodiment of operations performed by the system to forward the signed challenge to the storage drive to authenticate access to the diagnostic interface in the storage device.

FIG. 6 illustrates an embodiment of operations performed by the system diagnostic interface 118 to process the signed nonce (e.g., {hash(N+Ai)}$S_{Ai}$) and the retrieved digital certificate ($C_{Ai}$) 206 from the authorized unlock system 108. Upon receiving the signed nonce, the system diagnostic interface 118 determines (at block 602) a physical presence security identifier (PSID) which can only be determined by physical inspection of the physical storage device 102, such as by reading a label affixed to an outer surface of the physical storage device 102. A user of the system 100 may observe and enter the PSID into a user interface of the system diagnostic interface 118. The determining of the PSID ensures that the user of the system 100 is at a same physical location of the storage device 102 to be able to read the PSID to provide a level of security in preventing remote access of the diagnostic interface. The system diagnostic interface 118 may further receive (at block 604) selection via a user interface of a persistent or transient unlock request. Upon receiving selection of the type of unlock request, the system diagnostic interface 118 sends (at block 606) the PSID, the signed nonce (e.g., {hash(N+Ai)}$S_{Ai}$), and the digital certificate ($C_{Ai}$) to the storage device 102 with either a persistent or transient unlock request.

Figure 7A:
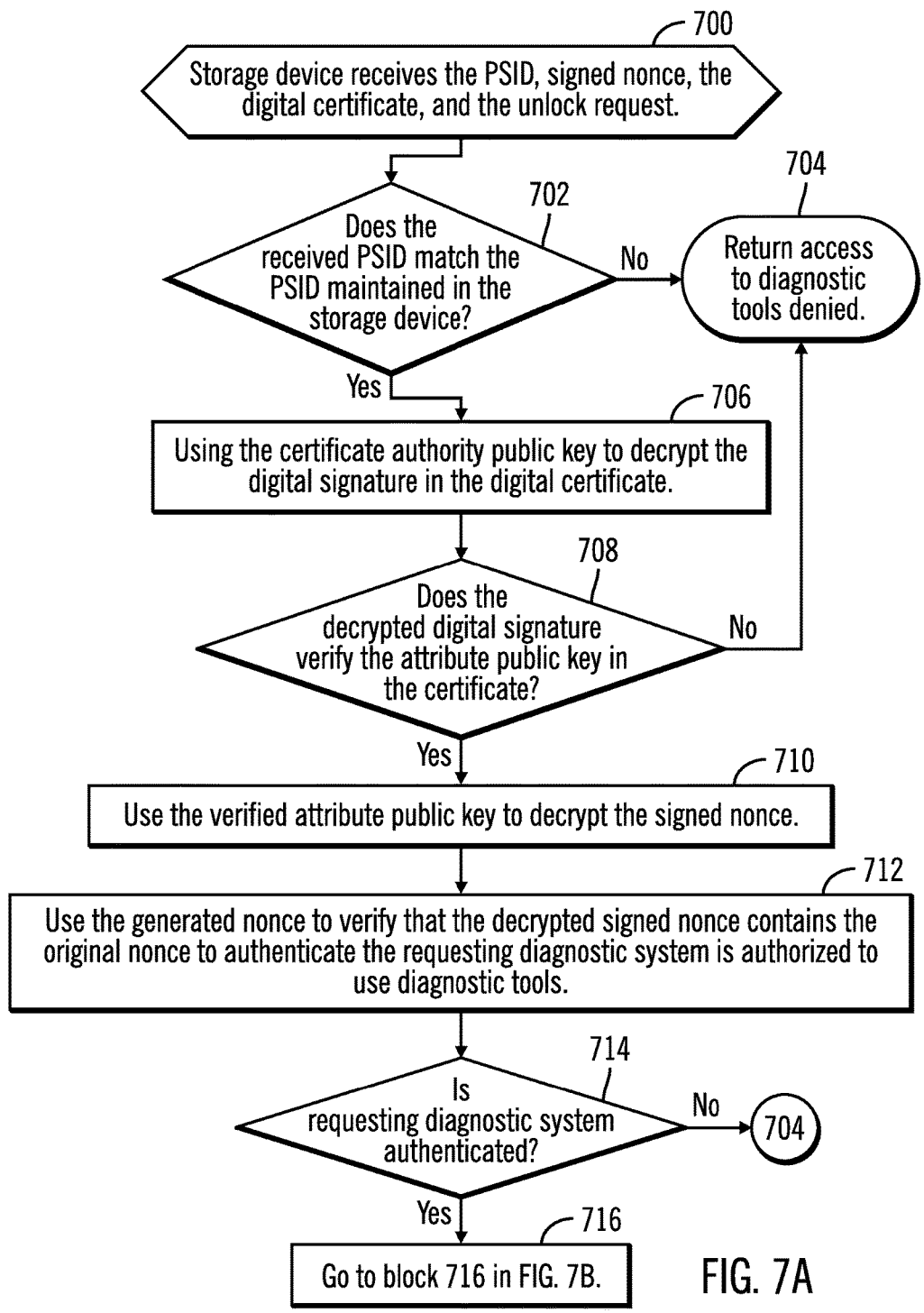
FIGS. 7a and 7b illustrate an embodiment of operations performed by the storage derive to authenticate the signed challenge for the system.
Figure 7B:
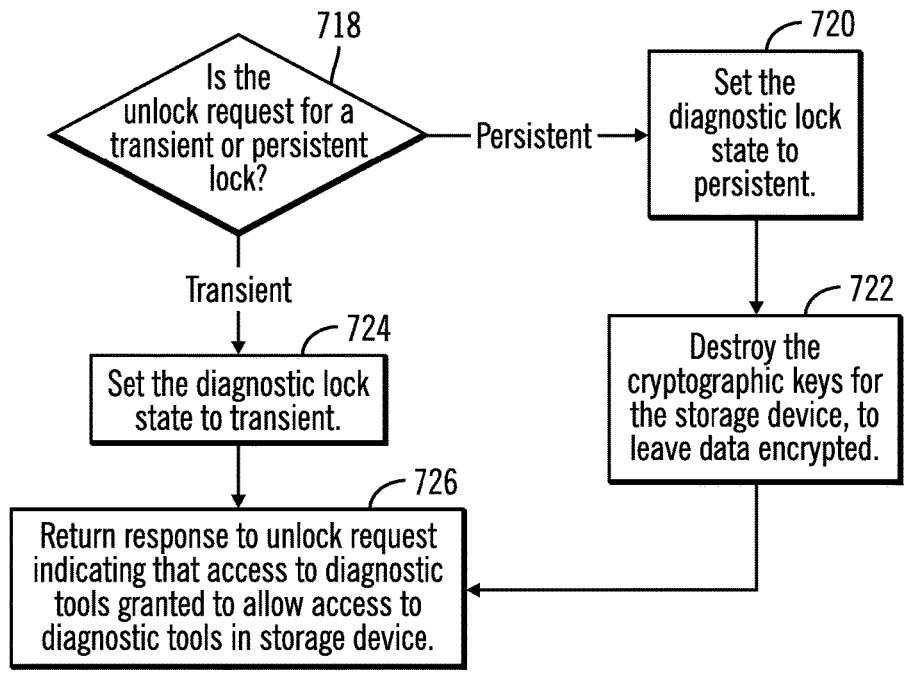

FIGS. 7a and 7b illustrate an embodiment of operations performed by the diagnostic authentication program 128 in the storage device 102 to authenticate the system diagnostic interface 118 unlock request. Upon receiving the PSID, the signed nonce (e.g., {hash(N+Ai)}$S_{Ai}$), the digital certificate ($C_{Ai}$), and the unlock request, the diagnostic authentication program 128 determines (at block 702) whether the received PSID matches the PSID 130 maintained in the storage device 102 firmware. If there is no match, then it assumed the system 100 initiating the request is not at the same—physical location as the storage device 102, and access denied to the diagnostic interface is returned (at block 704). If (at block 702) there is a match, then the diagnostic authentication program 128 uses (at block 706) the certificate authority public key ($P_{CA}$) 132 to decrypt the digital signature, i.e., the encrypted hash of the attribute public key ($P_{Ai}$) in the digital certificate ($C_{Ai}$). The diagnostic authentication program 128 may then determine (at block 708) whether the decrypted digital signature verifies the attribute public key ($P_{Ai}$) in the digital certificate ($C_{Ai}$). For instance, if the decrypted digital signature produces a hash of the attribute public key ($P_{Ai}$), then the diagnostic authentication program 128 may hash the copy of the public key ($P_{Ai}$) to determine if that hashed public key ($P_{Ai}$) matches the output of decrypting the digital signature, where the attribute public key ($P_{Ai}$) is verified if there is a match. If (at block 708) the attribute public key ($P_{Ai}$), is not verified, then control proceeds to 704 to deny the request to unlock the access to the diagnostic interface 122. Verification of the attribute public key ($P_{Ai}$) means the storage device 102 can be assured the key is from a trusted source which is trusted to verify the system 100 initiating the unlock request.

If (at block 708) the attribute public key ($P_{Ai}$) is verified using the digital certificate ($C_{Ai}$), then the verified attribute public key ($P_{Ai}$) is used (at block 710) to decrypt the signed nonce (e.g., $\{hash(N+Ai)\}S_{Ai}$) to produce the hashed nonce (N) and attribute Ai. The diagnostic authentication program 128 then uses (at block 712) the generated nonce 135 to verify that the decrypted signed nonce contains the original nonce 135 to authenticate that the requesting system 100 is authorized to use diagnostic interface 122. For instance, if the result of decrypting the signed nonce is the hashed nonce and attribute, then the diagnostic authentication program 128 may hash the original nonce 135 and attribute and compare that to the outcome of decrypting the signed nonce, and if there is a match, then the system 100 is authenticated.

If (at block 714) the signed nonce is not verified, then control proceeds 704 to deny the request to unlock and access the diagnostic interface 122. If (at block 714) the signed nonce was verified, which also involved verifying the attribute public key, then control proceeds (at block 716) to block 718 in FIG. 7b to process the unlock request. If (at 718) the unlock request is for a persistent unlock, then the diagnostic lock state 133 is set (at block 720) to indicate a persistent unlock and all the cryptographic keys 124 for the storage device 102 are destroyed (at block 722) to prevent access to any user data in the storage media 126 during the use of diagnostic interface 122. If (at block 718) the unlock request is for a transient unlock, then the diagnostic lock state 133 is set (at block 724) to a transient unlock. After setting the unlock state in the diagnostic lock state 133, at blocks 722 or 724, control proceeds to block 726 to return a response to the unlock request indicating that access to the diagnostic interface 122 is granted to allow access to the diagnostic interface 122 in the storage device 102 to perform diagnostic operations.

Figure 8:
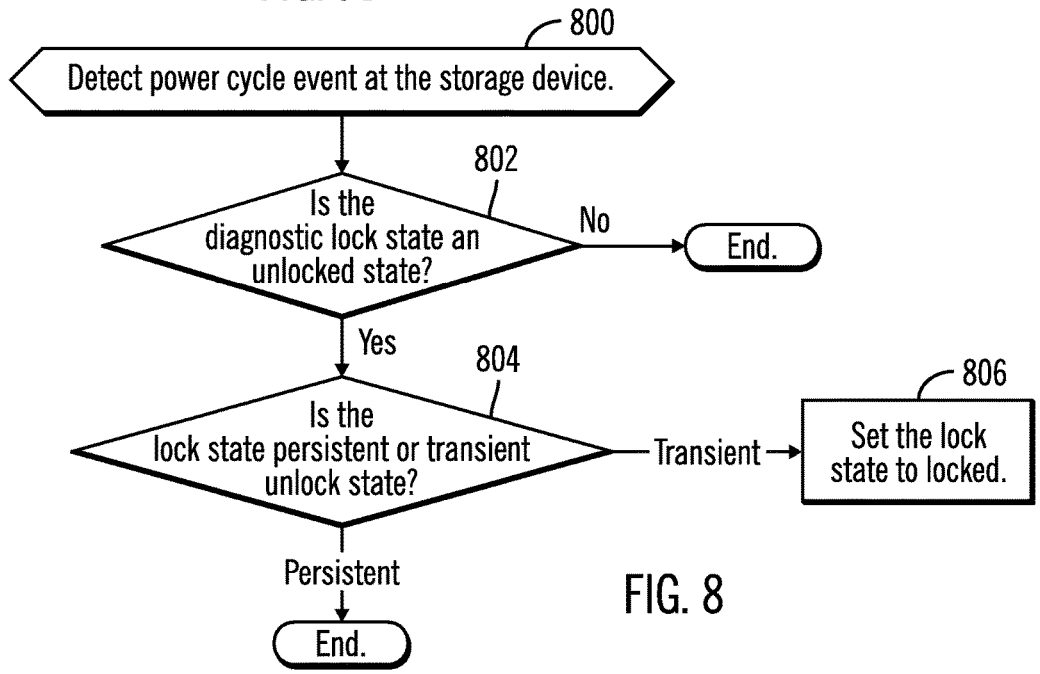
FIG. 8 illustrates an embodiment of operations performed by the storage drive to handle a power cycle event.

FIG. 8 illustrates an embodiment of operations performed by the storage device 102 controller 120 to process a power cycle event. Upon detecting (at block 800) a power cycle event at the storage device 102, the controller 120 determines (at block 802) if the diagnostic lock state 133 is in an unlocked state. If not, then control ends. If (at block 802) the state is unlocked and is (at block 804) transient unlocked, then the controller 120 sets (at block 806) the diagnostic lock state 133 to locked. Otherwise, if the diagnostic lock state 133 is persistent, then control ends.

With the described embodiments, a user of a system seeking to access a storage device diagnostic interface, needs to obtain a nonce for the storage device to present to an authorized unlock system to sign the nonce along with a digital certificate verifying the public key that can decrypt the signed nonce. If the storage device authenticates the system using the signed nonce, digital certificate for the public key to decrypt the signed nonce, and a physical presence identifier, then the system is granted access to the diagnostic interface and procedures in the storage device.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the diagnostic interface 118, diagnostic authentication program 128, controller 120, and diagnostic authorization program 134 may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

Figure 9:
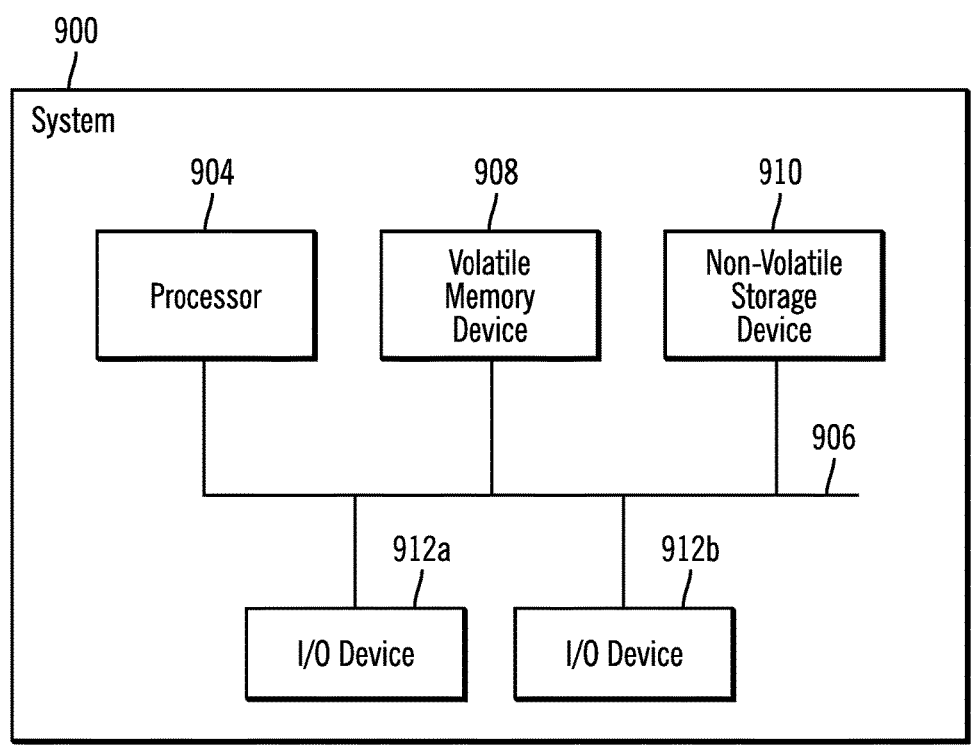
FIG. 9 illustrates a system in which the components of FIG. 1 may be implemented.

FIG. 9 illustrates an embodiment of a system 900 in which the system 100, authorized unlock system 108, and certificate authority 114 may be implemented. The system includes a processor 904 that communicates over a bus 906 with a volatile memory device 908 in which programs, operands and parameters being executed are cached, such as the system diagnostic interface 118 and the diagnostic authorization program 134 and a non-volatile storage device 910, in which data and programs may be stored. The processor 904 may also communicate with Input/Output (I/O) devices 912a, 912b, which may comprise input devices, display devices, graphics cards, ports, network interfaces, etc. The non-volatile storage device 910 may be mounted to the system enclosure 900, such as in a storage drive bay, or connected to the system 900 through a port interface or over the network.

EXAMPLES

The following examples pertain to further embodiments.

Example 1 is a storage device for authenticating a system to enable access to a diagnostic interface in the storage device, comprising: a computer readable storage medium implemented to store data; a controller coupled to the computer readable storage medium to: receive a request to initiate a cryptographic nonce to enable access to a diagnostic interface in the storage device; generate the cryptographic nonce and return in response to the request; receive an unlock request to access the diagnostic interface including a signed nonce comprising at least the nonce encrypted with a private key by an authorized unlock system; and use a public key that is a cryptographic pair with the private key to decrypt the signed nonce to determine whether to grant access to the diagnostic interface in the storage device.

In Example 2, the subject matter of Examples 1 and 3-11 can optionally include that the controller is further to verify that the nonce in the signed nonce that is decrypted matches the nonce that was generated; and grant the computer system access to the diagnostic interface in the storage device in response to verifying that that the nonce in the signed nonce in matches the nonce that was generated.

In Example 3, the subject matter of Examples 1, 2 and 4-11 can optionally include that the unlock request is received with a physical presence security identifier (PSID) indicated on the storage device, wherein the controller is further to: determine whether the PSID included with the unlock request matches a local PSID stored in the storage device, wherein the computer system is granted access to the diagnostic interface in response to determining that the PSID included with the unlock request matches the local PSID.

In Example 4, the subject matter of Examples 1-3 and 5-11 can optionally include that the signed nonce comprises the nonce and an attribute of the storage device encrypted with the private key, wherein the private key is associated with the attribute in the authorized unlock system.

In Example 5, the subject matter of Examples 1-4 and 6-11 can optionally include that the signed nonce comprises a cryptographic hash of the nonce and the attribute of the storage device encrypted with the private key.

In Example 6, the subject matter of Examples 1-5 and 7-11 can optionally include that the unlock request further comprises receiving with the signed nonce a digital certificate generated by a certificate authority, wherein the digital certificate is used to authenticate the authorized unlock system as authorized by the certificate authority.

In Example 7, the subject matter of Examples 1-6 and 8-11 can optionally include that the private key comprises an attribute private key associated with an attribute of the storage device in the authorized unlock system, wherein the digital certificate includes an attribute public key subject to a hash and then encrypted with a certificate authority private key of the certificate authority to form a digital signature, wherein the attribute public key decrypts messages encrypted with the attribute private key, and wherein the storage device uses the attribute public key to decrypt and verify the nonce in the signed nonce.

In Example 8, the subject matter of Examples 1-7 and 9-11 can optionally include that the storage device stores a certificate authority public key, wherein the controller is further to: use the certificate authority public key to decrypt the digital certificate to produce a hashed attribute public key comprising the attribute public key subject to a cryptographic hash; apply the cryptographic hash to a copy of the attribute public key to produce a copy of the hashed attribute public key; verify whether the hashed attribute public key produced from the digital signature matches the copy of the hashed attribute public key; and using the copy of the attribute public key to decrypt in response to determining the hashed attribute public key matches the copy of the hashed attribute public key.

In Example 9, the subject matter of Examples 1-3 and 5-11 can optionally include that the unlock request comprises a transient unlock request, wherein the grant of the computer system access to the diagnostic interface comprises indicate a lock state as having a transient unlock state, wherein the controller is further to: detect a power cycle event; determine whether a lock state is a transient unlock state; and indicate the lock state to locked in response to determining that the lock state is the transient unlock state.

In Example 10, the subject matter of Examples 1-9 and 11 can optionally include that the unlock request comprises a persistent unlock request, wherein the grant of the computer system access to the diagnostic interface comprises: indicate a lock state as having a persistent unlock state; and destroy cryptographic keys in the storage device used to encrypt and decrypt data in the storage device.

In Example 11, the subject matter of Examples 1-10 can optionally include that the controller is further to: detect a power cycle event; determine whether the lock state is one of a transient unlock state or the persistent unlock state; and reset the lock state to locked in response to determine that the transient unlock state is set, wherein the lock state remains in the persistent unlock state in response to determining that the lock state is the persistent lock state.

Example 12 is a system for authenticating a system to enable access to a diagnostic interface in a storage device comprising: a computer system in communication with an authorized unlock system; a storage device in communication with the computer system, including: a computer readable storage medium implemented to store data; and a controller coupled to the computer readable storage medium to: receive a request from the computer system to initiate a cryptographic nonce to access diagnostic interface in the storage device; generate a nonce and return to the computer system in response to the request; receive an unlock request from the computer system to access the diagnostic interface including a signed nonce comprising at least the nonce encrypted with a private key by the authorized unlock system; and use a public key that is a cryptographic pair with the private key to decrypt the signed nonce to determine whether to grant the computer system access to the diagnostic interface in the storage device.

In Example 13, the subject matter of Examples 12 and 14-18 can optionally include that the unlock request is received with a physical presence security identifier (PSID) indicated on the storage device, wherein the controller is further to: determine whether the PSID included with the unlock request matches a local PSID stored in the storage device, wherein the computer system is granted access to the diagnostic interface in response to determining that the PSID included with the unlock request matches the local PSID.

In Example 14, the subject matter of Examples 12, 13, and 15-18 can optionally include that the signed nonce comprises the nonce and an attribute of the storage device encrypted with the private key, wherein the private key is associated with the attribute in the authorized unlock system.

In Example 15, the subject matter of Examples 12-14 and 16-18 can optionally include that the unlock request further comprises receiving with the signed nonce a digital certificate generated by a certificate authority, wherein the digital certificate is used to authenticate the authorized unlock system as authorized by the certificate authority.

In Example 16, the subject matter of Examples 12-15, 17, and 18 can optionally include that the private key comprises an attribute private key associated with an attribute of the storage device in the authorized unlock system, wherein the digital certificate includes an attribute public key subject to a hash and then encrypted with a certificate authority private key of the certificate authority to form a digital signature, wherein the attribute public key decrypts messages encrypted with the attribute private key, and wherein the storage device uses the attribute public key to decrypt and verify the nonce in the signed nonce.

In Example 17, the subject matter of Examples 12-16 and 18 can optionally include that the unlock request comprises a transient unlock request, wherein the grant of the computer system access to the diagnostic interface comprises indicate a lock state as having a transient unlock state, wherein the controller is further to: detect a power cycle event; determine whether a lock state is a transient unlock state; and indicate the lock state to locked in response to determining that the lock state is the transient unlock state.

In Example 18, the subject matter of Examples 12-17 can optionally include that the unlock request comprises a persistent unlock request, wherein the grant of the computer system access to the diagnostic interface comprises: indicate a lock state as having a persistent unlock state; and destroy cryptographic keys in the storage device used to encrypt and decrypt data in the storage device.

Example 19 is a method for authenticating a system to enable access to a diagnostic interface in as storage device, comprising: receiving a request from a computer system coupled to the storage device to initiate a cryptographic nonce to access diagnostic interface in the storage device; generating a nonce and return to the computer system in response to the request; receiving an unlock request from the computer system to access the diagnostic interface including a signed nonce comprising at least the nonce encrypted with a private key by an authorized unlock system; and using a public key that is a cryptographic pair with the private key to decrypt the signed nonce to determine whether to grant the computer system access to the diagnostic interface in the storage device.

In Example 20, the subject matter of Examples 19, 21-26 can optionally include that the unlock request is received with a physical presence security identifier (PSID) indicated on the storage device, further comprising: determine whether the PSID included with the unlock request matches a local PSID stored in the storage device, wherein the computer system is granted access to the diagnostic interface in response to determining that the PSID included with the unlock request matches the local PSID.

In Example 21, the subject matter of Examples 19, 20, and 22-26 can optionally include that the signed nonce comprises the nonce and an attribute of the storage device encrypted with the private key, wherein the private key is associated with the attribute in the authorized unlock system.

In Example 22, the subject matter of Examples 19-21 and 23-26 can optionally include that the receive the unlock request further comprises receiving with the signed nonce a digital certificate generated by a certificate authority, wherein the digital certificate is used to authenticate the authorized unlock system as authorized by the certificate authority.

In Example 23, the subject matter of Examples 19-22 and 24-26 can optionally include that the private key comprises an attribute private key associated with an attribute of the storage device in the authorized unlock system, wherein the digital certificate includes an attribute public key subject to a hash and then encrypted with a certificate authority private key of the certificate authority to form a digital signature, wherein the attribute public key decrypts messages encrypted with the attribute private key, and wherein the storage device uses the attribute public key to decrypt and verify the nonce in the signed nonce.

In Example 24, the subject matter of Examples 19-23 and 25-26 can optionally include that the unlock request comprises a transient unlock request, wherein the grant of the computer system access to the diagnostic interface comprises indicate a lock state as having a transient unlock state, further comprising: detecting a power cycle event; determining whether a lock state is a transient unlock state; and indicating the lock state to locked in response to determining that the lock state is the transient unlock state.

In Example 25, the subject matter of Examples 19-24 and 26 can optionally include that the unlock request comprises a persistent unlock request, wherein the grant of the computer system access to the diagnostic interface comprises: indicating a lock state as having a persistent unlock state; and destroying cryptographic keys in the storage device used to encrypt and decrypt data in the storage device.

In Example 26, the subject matter of Example 19 can optionally include at least any one of:
(1) verifying that the nonce in the signed nonce that is decrypted matches the nonce that was generated; and granting the computer system access to the diagnostic interface in the storage device in response to verifying that that the nonce in the signed nonce in matches the nonce that was generated; and/or
(2) wherein the unlock request is received with a physical presence security identifier (PSID) indicated on the storage device, determining whether the PSID included with the unlock request matches a local PSID stored in the storage device, wherein the computer system is granted access to the diagnostic interface in response to determining that the PSID included with the unlock request matches the local PSID; and/or (3) wherein the signed nonce comprises the nonce and an attribute of the storage device encrypted with the private key, wherein the private key is associated with the attribute in the authorized unlock system; and/or (4) wherein the signed nonce comprises a cryptographic hash of the nonce and the attribute of the storage device encrypted with the private key; and/or (5) wherein the unlock request further comprises receiving with the signed nonce a digital certificate generated by a certificate authority, wherein the digital certificate is used to authenticate the authorized unlock system as authorized by the certificate authority; and/or (6) wherein the private key comprises an attribute private key associated with an attribute of the storage device in the authorized unlock system, wherein the digital certificate includes an attribute public key subject to a hash and then encrypted with a certificate authority private key of the certificate authority to form a digital signature, wherein the attribute public key decrypts messages encrypted with the attribute private key, and wherein the storage device uses the attribute public key to decrypt and verify the nonce in the signed nonce; and/or (7) wherein the storage device stores a certificate authority public key, further comprising: using the certificate authority public key to decrypt the digital certificate to produce a hashed attribute public key comprising the attribute public key subject to a cryptographic hash; applying the cryptographic hash to a copy of the attribute public key to produce a copy of the hashed attribute public key; and verify whether the hashed attribute public key produced from the digital signature matches the copy of the hashed attribute public key; and using the copy of the attribute public key to decrypt in response to determining the hashed attribute public key matches the copy of the hashed attribute public key; and/or (8) wherein the unlock request comprises a transient unlock request, wherein the granting of the computer system access to the diagnostic interface comprises indicating a lock state as having a transient unlock state, further comprising detecting a power cycle event; determining whether a lock state is a transient unlock state; and indicating the lock state to locked in response to determining that the lock state is the transient unlock state; and/or (9) wherein the unlock request comprises a persistent unlock request, wherein the granting of the computer system access to the diagnostic interface comprises: indicating a lock state as having a persistent unlock state; and destroying cryptographic keys in the storage device used to encrypt and decrypt data in the storage device; and/or

(10) detecting a power cycle event; determining whether the lock state is one of a transient unlock state or the persistent unlock state; and resetting the lock state to locked in response to determine that the transient unlock state is set, wherein the lock state remains in the persistent unlock state in response to determining that the lock state is the persistent lock state.

Example 27 is an apparatus for authenticating a system to enable access to a diagnostic interface in as storage device, comprising: means for receiving a request from a computer system coupled to the storage device to initiate a cryptographic nonce to access diagnostic interface in the storage device; means for generating a nonce and return to the computer system in response to the request; means for receiving an unlock request from the computer system to access the diagnostic interface including a signed nonce comprising at least the nonce encrypted with a private key by an authorized unlock system; and means for using a public key that is a cryptographic pair with the private key to decrypt the signed nonce to determine whether to grant the computer system access to the diagnostic interface in the storage device.

In Example 28, the subject matter of Example 27 can optionally include that the unlock request is received with a physical presence security identifier (PSID) indicated on the storage device, further comprising: means for determine whether the PSID included with the unlock request matches a local PSID stored in the storage device, wherein the computer system is granted access to the diagnostic interface in response to determining that the PSID included with the unlock request matches the local PSID.

Example 29 is an apparatus comprising means to perform a method as claimed in any preceding claim.

Example 30 is a machine-readable storage including machine-readable instructions, when executed, to implement a method or realize an apparatus or system as claimed in any preceding claim.

Example 31 is a system, method, and computer readable storage medium to: send a request to a storage device to initiate authentication to access a diagnostic interface within the storage device; receive from the storage device, in response to the request to initiate the authentication a nonce; determine an attribute of the storage device; transmit the nonce and the attribute to the authorized unlock system; receive from the authorized unlock system a signed nonce comprising at least the nonce encrypted with a private key; sending the signed nonce to the storage device with an unlock request; and receiving a response from the storage device indicating that access to the interface is permitted in response to the storage device authenticating the signed nonce.

In Example 32, the subject matter of Example 31 and 33-39 can optionally include that the determine the attribute comprises: determine a model number of the storage device, wherein the attribute comprises the model number.

In Example 33, the subject matter of Example 31, 22, and 34-39 can optionally include: determine a physical presence security identifier (PSID) indicated on the storage device; and send the PSID with the signed nonce to the storage device, wherein the storage device uses the PSID and the signed nonce to authenticate access to the interface.

In Example 34, the subject matter of Example 31-33 and 35-39 can optionally include that the determine the PSID comprises receive input indicating the PSID obtained from the storage device.

In Example 35, the subject matter of Example 31-34 and 36-39 can optionally include that the signed nonce comprises the nonce and the attribute encrypted with the private key, wherein the private key is associated with the attribute in the authorized unlock system.

In Example 36, the subject matter of Example 31-35 and 37-39 can optionally include that the receive from the authorized unlock system the signed nonce further includes a digital certificate from a certificate authority to certify that a public key that decrypts the signed nonce is being issued by an authorized unlock system verified by the certificate authority.

In Example 37, the subject matter of Example 31-36 and 38-39 can optionally include that the private key comprises an attribute private key associated with the attribute in the authorized unlock system, wherein the digital certificate includes an attribute public key subject to a hash and then encrypted with a private key of the certificate authority, wherein the attribute public key decrypts messages encrypted with the attribute private key, wherein the storage device uses the attribute public key, certified by the digital certificate, to decrypt and authenticate the nonce in the signed nonce.

In Example 38, the subject matter of Example 31-37 and 39 can optionally include that the unlock request comprises a transient unlock request to cause the storage device to enter a transient unlock state in which the interface can be accessed within the storage device, wherein in the transient unlock state, upon a power cycle event, the storage device transitions to a locked state in which interface are not accessible.

In Example 39, the subject matter of Example 31-38 can optionally include that the unlock request comprises a persistent unlock request to cause the storage device to enter a persistent unlock state in which the interface can be accessed within the storage device, wherein the persistent unlock state is unchanged in response to a power cycle event, and wherein the persistent unlock request causes the storage device to destroy encryption keys used to encrypt data in the storage device.

Example 40 is a method, system, and computer readable storage medium to: maintain a plurality of attribute private keys, wherein for each of the private keys there is a public key of a cryptographic public-private key pair, and wherein there is one attribute private key for a different of a plurality of attributes of a storage device; receive from the computer system a nonce from the storage device and an attribute of the storage device; determine a determined attribute private key comprising the attribute private key associated with the attribute received with the nonce; encrypting at least the nonce with the determined attribute private key to produce a signed nonce; and returning the signed nonce to the computer system, wherein the computer system provides the signed nonce to the storage device for authentication to access a interface in the storage device.

In Example 41, the subject matter of Example 40 and 42-49 can optionally include that the attribute comprises a model number of the storage device, wherein multiple attribute private keys are maintained for multiple model numbers of storage devices.

In Example 42, the subject matter of Example 40, 41 and 43-49 can optionally include return a digital certificate from a certificate authority to the computer system with the signed nonce, wherein the digital certificate includes the attribute public key used to decrypt messages encrypted with the determined attribute private key, wherein the digital certificate verifies that the attribute public key is from an authorized unlock system authorized by the certificate authority, wherein the certificate authority is trusted by the storage device.

In Example 43, the subject matter of Example 40-42 and 44-49 can optionally include maintain a plurality of digital certificates form the certificate authority including one digital certificate for each of the attributes for which one of the attribute private keys is maintained, where each of the digital certificates includes an attribute public key encrypted with a certificate authority private key that the storage device is to decrypt using a certificate authority public key included in the certificate, and wherein the storage device uses the attribute public key verified by the digital certificate to decrypt the digital signature and confirm the nonce in the digital signature matches a nonce generated by the storage device authenticate access to the interface in the storage device; and determine a determined certificate comprising the certificate associated with the attribute received with the nonce, wherein the certificate that is returned with the digital signature comprises the determined certificate.

In Example 44, the subject matter of Example 40-43 and 45-49 can optionally include: determine that there is no one of the attribute private keys associated with the attribute received with the nonce; and returning a message to the computer system of failure to sign the nonce in response to determining that there is no one of the attribute private keys associated with the attribute.

In Example 45, the subject matter of Example 40-44 and 46-49 can optionally include that the encrypting the at least nonce to produce the signed nonce comprises encrypting a combination of the nonce and the attribute received from the computer system.

In Example 46, the subject matter of Example 40-45 and 47-49 can optionally include: maintain for each of the attributes an expiration counter; determine whether the expiration counter for the selected attribute equals a threshold; and expiring the attribute private key for the selected attribute in response to determining that the expiration counter exceeds the threshold.

In Example 47, the subject matter of Example 40-42 and 44-49 can optionally include: maintain a plurality of digital certificates from a certificate authority including one digital certificate for each of the attributes for which one of the attribute private keys is maintained, where each of the digital certificates includes an attribute public key encrypted with a certificate authority private key that the storage device is to decrypt using a certificate authority public key included in the certificate, and wherein the storage device uses the attribute public key verified by the digital certificate to decrypt the signed nonce and confirm the nonce encrypted in the signed nonce matches a generated nonce from the storage device to authenticate access to the interface in the storage device, wherein the expiring the attribute private key for the selected attribute further comprises expiring the digital certificate for the selected attribute; and obtain a new digital certificate from the certificate authority for the selected attribute in response to expiring the digital certificate for the selected attribute.

In Example 48, the subject matter of Example 40-47 and 49 can optionally include: obtain a new public key and new private key of a cryptographic public-private key pair for the selected attribute, wherein the new digital certificate is provided to verify the new public key.

In Example 49, the subject matter of Example 40-48 can optionally include: interact with a secure cryptoprocessor in a system including the computer readable storage medium to generate the attribute private keys and access the attribute private keys protected by the secure cryptoprocessor.

What is claimed:

1. A storage device, comprising:
   a computer readable storage medium implemented to store data;
   a controller coupled to the computer readable storage medium to:
   receive a request to initiate a cryptographic nonce to enable access to a diagnostic interface in the storage device;
   generate the cryptographic nonce and return in response to the request;
   receive an unlock request to access the diagnostic interface including a signed nonce comprising at least the cryptographic nonce encrypted with an attribute private key by an authorized unlock system and a digital certificate generated by a certificate authority, wherein the digital certificate is used to authenticate the authorized unlock system as authorized by the certificate authority, wherein the attribute private key is associated with an attribute of the storage device, wherein the digital certificate includes an attribute public key subject to a hash and then encrypted with a certificate authority private key of the certificate authority to form a digital signature, and wherein the attribute public key decrypts messages encrypted with the attribute private key; and use the attribute public key to decrypt the signed nonce to determine whether to grant access to the diagnostic interface in the storage device.

2. The storage device of claim 1, wherein the controller is further to;

verify that the cryptographic nonce in the signed nonce that is decrypted matches the cryptographic nonce that was generated; and grant a computer system access to the diagnostic interface in the storage device in response to verifying that that the cryptographic nonce in the signed nonce in matches the cryptographic nonce.

3. The storage device of claim 1, wherein the unlock request is received with a physical presence security identifier (PSID) indicated on the storage device, wherein the controller is further to:

determine whether the PSID included with the unlock request matches a local PSID stored in the storage device, wherein a computer system is granted access to the diagnostic interface in response to determining that the PSID included with the unlock request matches the local PSID.

4. The storage device of claim 1, wherein the signed nonce comprises the cryptographic nonce and an attribute of the storage device encrypted with the attribute private key, wherein the attribute private key is associated with the attribute in the authorized unlock system.

5. The storage device of claim 4, wherein the signed nonce comprises a cryptographic hash of the cryptographic nonce and the attribute of the storage device encrypted with the attribute private key.

6. The storage device of claim 1, wherein the storage device stores a certificate authority public key, wherein the controller is further to:

use the certificate authority public key to decrypt the digital certificate to produce a hashed attribute public key comprising the attribute public key subject to a cryptographic hash;

apply the cryptographic hash to a copy of the attribute public key to produce a copy of the hashed attribute public key;

verify whether the hashed attribute public key produced from the digital signature matches the copy of the hashed attribute public key; and use the copy of the attribute public key to decrypt in response to determining the hashed attribute public key matches the copy of the hashed attribute public key.

7. The storage device of claim 1, wherein the unlock request comprises a transient unlock request, wherein the grant of a computer system access to the diagnostic interface comprises indicate a lock state as having a transient unlock state, wherein the controller is further to:

detect a power cycle event;

determine whether a lock state is a transient unlock state; and indicate the lock state to locked in response to determining that the lock state is the transient unlock state.

8. The storage device of claim 1, wherein the unlock request comprises a persistent unlock request, wherein the grant of a computer system access to the diagnostic interface comprises:

indicate a lock state as having a persistent unlock state; and destroy cryptographic keys in the storage device used to encrypt and decrypt data in the storage device.

9. The storage device of claim 8, wherein the controller is further to:

detect a power cycle event;

determine whether the lock state is one of a transient unlock state or the persistent unlock state; and reset the lock state to locked in response to determine that the transient unlock state is set, wherein the lock state remains in the persistent unlock state in response to determining that the lock state is the persistent unlock state.

10. A method implemented in a storage device, comprising:

receiving a request from a computer system coupled to the storage device to initiate a cryptographic nonce to access a diagnostic interface in the storage device;

generating a cryptographic nonce and return to the computer system in response to the request;

receiving an unlock request from the computer system to access the diagnostic interface including a signed nonce comprising at least the cryptographic nonce encrypted with an attribute private key by an authorized unlock system and a digital certificate generated by a certificate authority, wherein the digital certificate is used to authenticate the authorized unlock system as authorized by the certificate authority, wherein the attribute private key is associated with an attribute of the storage device, wherein the digital certificate includes an attribute public key subject to a hash and then encrypted with a certificate authority private key of the certificate authority to form a digital signature, and wherein the attribute public key decrypts messages encrypted with the attribute private key; and using the attribute public key to decrypt the signed nonce to determine whether to grant the computer system access to the diagnostic interface in the storage device.

11. The method of claim 10, wherein the unlock request is received with a physical presence security identifier (PSID) indicated on the storage device, further comprising:

determine whether the PSID included with the unlock request matches a local PSID stored in the storage device, wherein the computer system is granted access to the diagnostic interface in response to determining that the PSID included with the unlock request matches the local PSID.

12. The method of claim 10, wherein the signed nonce comprises the cryptographic nonce and an attribute of the storage device encrypted with the attribute private key, wherein the attribute private key is associated with the attribute in the authorized unlock system.

13. The method of claim 10, wherein the unlock request comprises a transient unlock request, wherein the grant of the computer system access to the diagnostic interface comprises indicate a lock state as having a transient unlock state, further comprising:

detecting a power cycle event;

determining whether a lock state is a transient unlock state; and indicating the lock state to locked in response to determining that the lock state is the transient unlock state.

14. The method of claim 10, wherein the unlock request comprises a persistent unlock request, wherein the grant of the computer system access to the diagnostic interface comprises:

indicating a lock state as having a persistent unlock state; and destroying cryptographic keys in the storage device used to encrypt and decrypt data in the storage device.

* * * * *